United States Patent

Cho et al.

(10) Patent No.: US 9,287,563 B2
(45) Date of Patent: Mar. 15, 2016

(54) ELECTRODE FOR LITHIUM SECONDARY BATTERY AND LITHIUM SECONDARY BATTERY INCLUDING THE SAME

(75) Inventors: Chae-Woong Cho, Yongin-si (KR);
Woon-Suk Jang, Yongin-si (KR);
Bum-Jin Chang, Yongin-si (KR);
Ki-Jun Kim, Yongin-si (KR); Kwi-Seok Choi, Yongin-si (KR); Maeng-Eun Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 992 days.

(21) Appl. No.: 13/244,450

(22) Filed: Sep. 24, 2011

(65) Prior Publication Data

US 2012/0189915 A1 Jul. 26, 2012

Related U.S. Application Data

(60) Provisional application No. 61/434,775, filed on Jan. 20, 2011.

(51) Int. Cl.

| *H01M 4/36* | (2006.01) |
| *H01M 4/58* | (2010.01) |
| *H01M 4/62* | (2006.01) |
| *H01M 4/60* | (2006.01) |
| *H01M 4/136* | (2010.01) |
| *H01M 10/052* | (2010.01) |

(52) U.S. Cl.
CPC .......... *H01M 4/5825* (2013.01); *H01M 4/136* (2013.01); *H01M 4/366* (2013.01); *H01M 4/602* (2013.01); *H01M 4/604* (2013.01); *H01M 4/62* (2013.01); *H01M 4/622* (2013.01); *H01M 10/052* (2013.01); *Y02E 60/122* (2013.01)

(58) Field of Classification Search
CPC ... H01M 4/136; H01M 4/366; H01M 4/5825; H01M 4/62; H01M 4/622; H01M 4/602; H01M 4/604
See application file for complete search history.

(56) References Cited

U.S. PATENT DOCUMENTS

| 2002/0086211 A1* | 7/2002 | Umeno et al. ............. 429/231.4 |
| 2005/0164086 A1* | 7/2005 | Bofinger et al. ............. 429/224 |
| 2005/0256270 A1 | 11/2005 | Weeks |
| 2006/0235144 A1 | 10/2006 | Hwang et al. |
| 2009/0117460 A1* | 5/2009 | Isaacson et al. ............. 429/209 |
| 2009/0220858 A1* | 9/2009 | Cheng et al. ............. 429/220 |
| 2010/0012403 A1 | 1/2010 | Fujita et al. |

FOREIGN PATENT DOCUMENTS

| CN | 101185184 A | 5/2008 |
| CN | 101453006 A | 6/2009 |

(Continued)

OTHER PUBLICATIONS

European Search Report dated May 29, 2012, for corresponding European Patent application 12151461.6, (7 pages).

(Continued)

*Primary Examiner* — Eugenia Wang

(74) *Attorney, Agent, or Firm* — Lewis Roca Rothgerber Christie LLP

(57) ABSTRACT

An electrode for a lithium secondary battery includes an electrode active material, a conductive agent, and a polyurethane-based compound, and has pores having an average diameter of about 2 to about 20 nm. A lithium secondary battery includes the electrode.

17 Claims, 5 Drawing Sheets

(56) References Cited

FOREIGN PATENT DOCUMENTS

| | | |
|---|---|---|
| CN | 100537649 C | 9/2009 |
| EP | 2 383 828 A2 | 11/2011 |
| JP | 09-129237 A | 5/1997 |
| JP | 2000-021408 | 1/2000 |
| JP | 2005-310764 | 11/2005 |
| JP | 2008-166058 A | 7/2008 |
| KR | 2001-0108237 A | 12/2001 |
| KR | 1020060044522 A | 5/2006 |
| WO | WO 00/49103 | 8/2000 |
| WO | WO 2007/083874 A1 | 7/2007 |
| WO | WO 2008023895 A1 * | 2/2008 |
| WO | WO 2008/078803 A1 | 7/2008 |

OTHER PUBLICATIONS

Machine Translation of JP 09-129237 A, 18 pgs, (May 16, 1997).
Machine Translation of JP 2000-021408, 17 pgs, (Jan. 21, 2000).
Machine Translation of JP 2005-310764, 70 pgs, (Nov. 4, 2005).
SIPO Office action dated Jan. 16, 2015, with English translation, for corresponding Chinese Patent application 201210013364.4, (17 pages).
English machine translation of Chinese publication 101453006 dated Jun. 10, 2009, listed above, (6 pages).
SIPO Office action dated Aug. 27, 2015, with English translation, for corresponding Chinese Patent application 201210013364.4, (16 pages).

* cited by examiner

ELECTRODE FOR LITHIUM SECONDARY BATTERY AND LITHIUM SECONDARY BATTERY INCLUDING THE SAME

CROSS-REFERENCE TO RELATED APPLICATIONS

This application claims the benefit of and priority to U.S. Provisional Application No. 61/434,775, filed on Jan. 20, 2011, in the United States Patent and Trademark Office, the entire content of which is incorporated herein in by reference.

BACKGROUND

1. Field

One or more embodiments of the present invention relate to electrodes for lithium secondary batteries and lithium secondary batteries including the same.

2. Description of Related Art

Recently, lithium secondary batteries are being used as power sources for portable compact electronic devices. Lithium secondary batteries have high energy density because they use organic electrolytes, and thus the discharge voltage of lithium secondary batteries is at least two times greater than that of batteries using conventional alkali aqueous electrolyte solutions.

In lithium secondary batteries, materials capable of intercalating and deintercalating lithium ions are used in the negative electrode and the positive electrode, and an organic electrolytic solution or a polymer electrolytic solution fills the space between the positive electrode and negative electrode. When lithium ions are intercalated or deintercalated, an oxidation reaction and a reduction reaction occur, respectively, and due to the oxidation reaction and the reduction reaction, electric energy is generated.

In order to prepare a positive electrode for a lithium secondary battery, a positive active material, a conductive agent, a binder, and a solvent are mixed and dispersed to prepare slurry, and then the slurry is coated and dried on a current collector.

The binder may be polyvinylidenefluoride, etc. However, when conventional binders are used, the binding force between the current collector and the active material, the workability of the slurry with respect to the current collector, and the performance of the resulting battery are unsatisfactory.

SUMMARY

According to one or more embodiments of the present invention, an electrode for a lithium secondary battery has improved high-rate characteristics, lifetime characteristics, and interior resistance characteristics.

According to other embodiments, a lithium secondary battery includes the electrode.

According to one or more embodiments of the present invention, an electrode for a lithium secondary battery includes a positive active material, a conductive agent, and a polyurethane-based compound, and has pores having an average diameter of about 2 to about 20 nm.

According to one or more embodiments of the present invention, a lithium secondary battery includes the electrode.

Electrodes for lithium secondary batteries according to one or more embodiments of the present invention have good high-rate characteristics, good interior resistance characteristics, and good lifetime characteristics due to the small average diameters of the pores in the active material layer.

DETAILED DESCRIPTION

Figure 1:
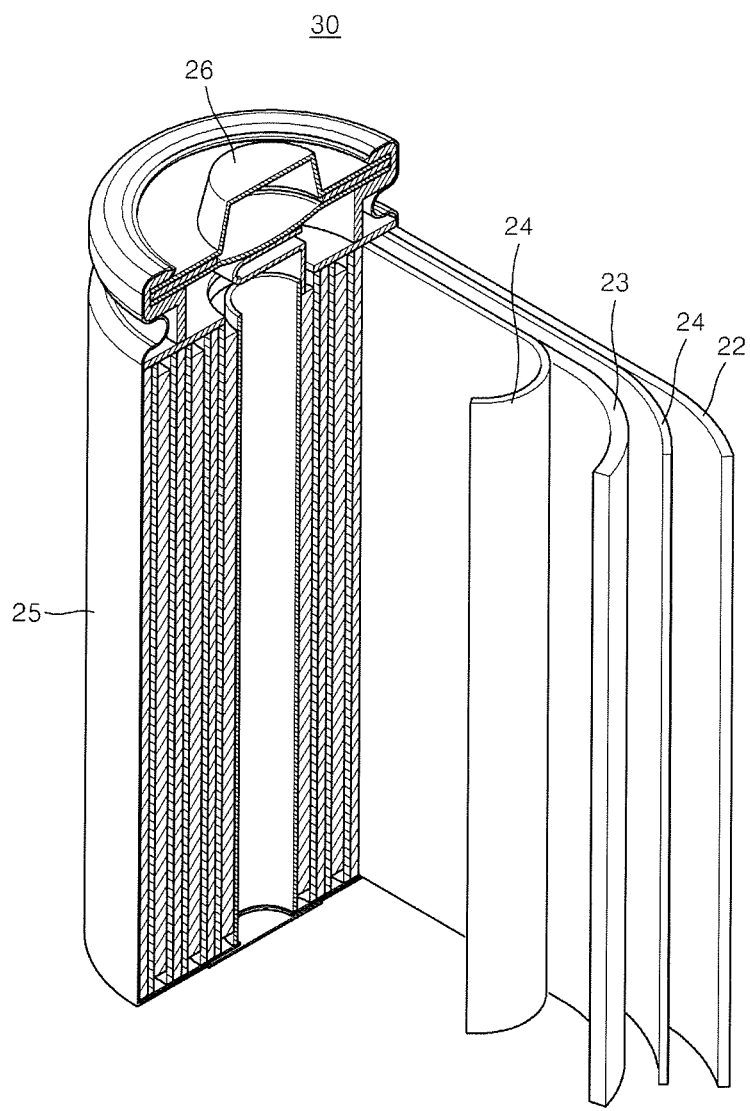
FIG. 1 is a cross-sectional perspective view of a lithium secondary battery according to an embodiment of the present invention.

An electrode for a lithium secondary battery according to embodiments of the present invention includes a positive active material, a conductive agent, a binder, and a polyurethane-based compound that is electrochemically stable.

The polyurethane-based compound is a polymerization product of a diisocyanate-based compound and a polyol. If the polyurethane-based compound is used when forming the electrode active material layer, a component of the active material layer (e.g., for example, the conductive agent) is well dispersed, and thus the viscosity of the composition for forming the electrode active material layer can be appropriately controlled. Thus, the composition for forming the electrode active material layer may be easily coated on a current collector. Also, an electrode and a battery manufactured using the polyurethane-based compound may have high stability and good lifetime characteristics. The diisocyanate-based compound may be an aliphatic diisocyanate-based compound, an alicyclic diisocyanate compound or an aromatic diisocyanate-based compound.

Nonlimiting examples of an aliphatic diisocyanate-based compound include compounds represented by the following formulae:

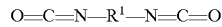

in which $R^1$ is a substituted or unsubstituted straight-chain $C_{2-12}$ aliphatic hydrocarbon group, or a substituted or unsubstituted branched $C_{2-12}$ aliphatic hydrocarbon group. For example, $R^1$ is a substituted or unsubstituted $C_{4-8}$ aliphatic hydrocarbon group such as hexamethylene diisocyanate.

Nonlimiting examples of an alicyclic diisocyanate-based compound include compounds represented by the following formulae:

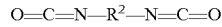

in which $R^2$ is a substituted or unsubstituted alicyclic hydrocarbon group with from 5 to 20 carbon atoms;

For the substituted straight-chain aliphatic hydrocarbon group, substituted branched aliphatic hydrocarbon group, and substituted alicyclic hydrocarbon group, at least one hydrogen atom of the respective hydrocarbon group may be substituted by one or more groups selected from the group consisting of a halogen atom; a $C_1$-$C_{20}$ alkyl group substituted with a halogen atom, for example, a —$CCF_3$, —$CHCF_2$, $CH_2F$ or —$CCl_3$ group; a $C_1$-$C_{20}$ alkoxy group; a $C_2$-$C_{20}$ alkoxyalkyl group; a hydroxy group; a nitro group; a cyano group; an amino group; an amidino group; a hydrazine group; a hydrazone group; a carboxyl group or salt thereof; a sulfonyl group; a sulfamoyl group; a sulfonic acid group or salt thereof; a phosphoric acid group or salt thereof; a $C_1$-$C_{20}$ alkyl group; a $C_2$-$C_{20}$ alkenyl group; a $C_2$-$C_{20}$ alkynyl group; a $C_1$-$C_{20}$ heteroalkyl group; a $C_6$-$C_{20}$ aryl group; a $C_6$-$C_{20}$ arylalkyl group; a $C_6$-$C_{20}$ heteroaryl group; a $C_7$-$C_{20}$ heteroarylalkyl group; a $C_6$-$C_{20}$ heteroaryloxy group; a $C_6$-$C_{20}$ heteroaryloxyalkyl group; or a $C_6$-$C_{20}$ heteroarylalkyl group.

Between one and five hydrogen atoms are replaced by the above groups, for example, between one and three. The substituent is selected from the group consisting of a halogen atom; a $C_1$-$C_{20}$ alkyl group substituted with a halogen atom, for example, a —$CCF_3$, —$CHCF_2$, $CH_2F$ or —$CCl_3$ group; a $C_1$-$C_{20}$ alkoxy group; a hydroxy group; a carboxyl group or salt thereof; a $C_1$-$C_{20}$ alkyl group; a $C_6$-$C_{20}$ aryl group; and a $C_6$-$C_{20}$ heteroaryl group.

Examples of the alicyclic diisocyanate-based compound include compounds represented by the following formulae:

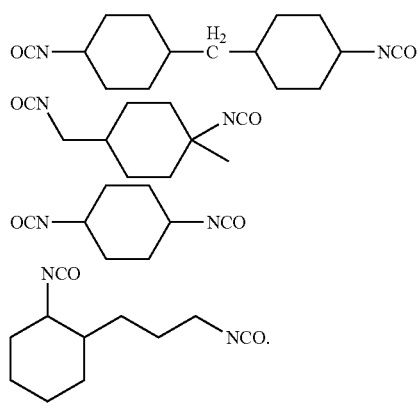

Nonlimiting examples of an aromatic diisocyanate-based compound include compounds represented by the following formulae:

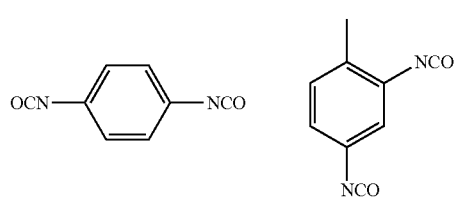

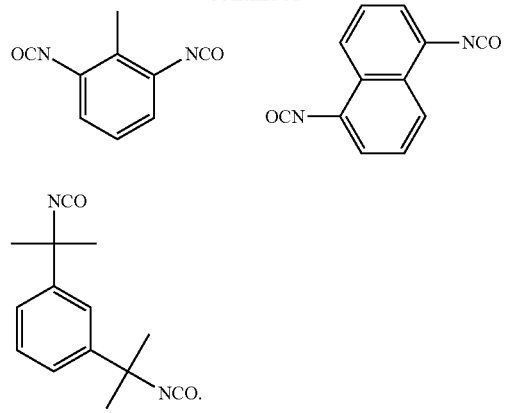

The at least one polyol has between 1 and 10 carbon atoms and between 2 and 6 hydroxyl groups, for example, between 1 and 6 carbon atoms and between 2 and 4 hydroxyl groups. In embodiments of the present invention the polyol may be a $C_{1-5}$-diol, -triol or tetraol, for example, a $C_{2-4}$ diol.

The polyurethane-based compound may be prepared as follows: an isocyanate-based compound, an alcohol compound, and a solvent are mixed to prepare a polyurethane prepolymer, and then the polyurethane prepolymer is polymerized to produce the polyurethane-based compound.

For example, a mixture including an isocyanate-based compound, an alcohol compound, and a solvent undergoes a polymerization and condensation reaction at a temperature of −10 to 25° C. to produce a corresponding polyurethane prepolymer. Within this temperature range, the yield of the polymerization and condensation reaction is high.

Then, a catalyst is added to the polyurethane prepolymer, and then heat treatment is performed at a temperature of 80 to 130° C. to perform the polymerization reaction, thereby producing a polyurethane-based compound. If the polymerization temperature is within this range, the yield of the polyurethane-based compound is high.

The catalyst may be dibutyltin laurate or 4-diazabicyclo[2,2,2]-octane. An amount of the catalyst may be about $10^{-5}$ to about $10^{-2}$ mol, for example, about $10^{-4}$ to about $10^{-2}$ mol, based on 1 mol of the diisocyanate-based compound. If the amount of the catalyst is within these ranges, reactivity of the polymerization reaction is high.

The solvent may be dimethylacetamide or dimethylformamide. An amount of the solvent may be about 80 to about 120 parts by weight based on 100 parts by weight of the diisocyanate-based compound.

The polyurethane-based compound according to an embodiment of the present invention may have a weight average molecular weight of about 5,000 to about 20,000 g/mol, and may be, for example, a compound represented by Formula 1 or Formula 2 below:

Formula 1

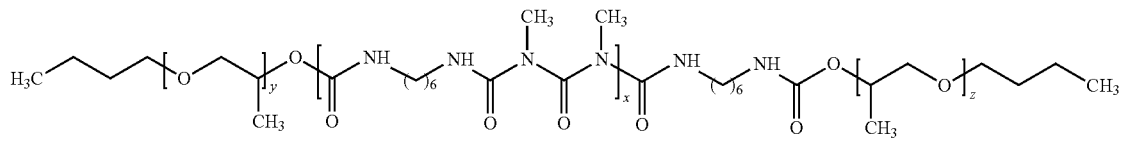

In Formula 1, x is an integer of 1 to 100, y is an integer of 1 to 100, and z is an integer of 1 to 100.

In Formula 3, M is a metal selected from Fe, Ti, V, Cr, Co, Ni, and combinations thereof.

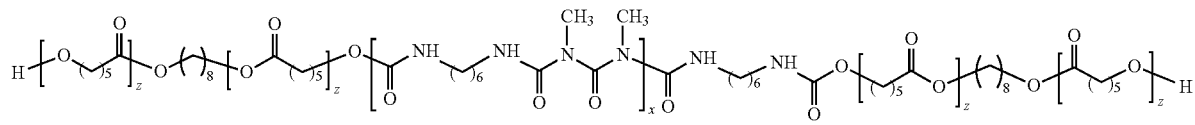

Formula 2

In Formula 2, x is an integer of 1 to 100, and z is an integer of 1 to 100.

For example, in some embodiments, in Formula 1, x is 30, y is 15, and z is 10, and in Formula 2, x is 20 and z is 10.

In the electrode, an amount of the polyurethane-based compound may be about 10 to about 50 parts by weight, for example, about 10 to about 30 parts by weight based on 100 parts by weight of the conductive agent. If the amount of the polyurethane-based compound is within these ranges, the viscosity of the composition for forming the electrode active material layer may be reduced, and the solid content in the electrode active material layer may be increased, resulting in an electrode (using the polyurethane-based compound) that has good capacity characteristics.

The viscosity of the composition for forming the electrode active material layer including the polyurethane-based compound may differ according to the kind or amount of the conductive agent, binder, solvent, etc. According to embodiments of the present invention, the viscosity of the composition for forming the electrode active material layer may be about 6 to about 14 Pa·s, for example, about 6.46 to about 13.91 Pa·s.

The composition for forming the electrode active material layer may be, for example, a composition for forming a positive active material layer. An amount of the polyurethane-based compound may be about 0.1 to about 5 parts by weight based on 100 parts by weight of the positive active material. If the amount of the polyurethane-based compound is within this range, the conductive agent may be uniformly dispersed in the electrode, and thus the viscosity of the composition for forming the active material layer may be appropriately controlled, resulting in an electrode (using the composition) having high capacity.

The conductive agent may be any conducting material that does not cause a chemical change in the battery. Nonlimiting examples of the conducting agent include graphite (such as natural graphite or artificial graphite), carbonaceous materials (such as carbon black, acetylene black, ketjen black, channel black, furnace black, lamp black, or summer black), conducting fibers (such as carbonaceous fibers or metal fibers), metal powders (such as carbon fluoride powders, aluminum powders, or nickel powders), conducting whiskers (such as zinc oxide or potassium titanate), conducting metal oxides (such as a titanium oxide), and conducting materials (such as polyphenylene derivatives).

An amount of the conductive agent may be about 1 to 10 parts by weight based on 100 parts by weight of the positive active material. If the amount of the conductive agent is within this range, the electrode manufactured using the conductive agent may have good conductivity.

The positive active material may not be particularly limited, and may be, for example, a lithium metal phosphate-based compound represented by Formula 3 below:

$$LiMPO_4 \quad \text{Formula 3}$$

Also, a coating layer including at least one material selected from metal oxynitrides, metal nitrides, and mixtures thereof may be formed on the surface of the lithium metal phosphate-based compound. If the coating layer is formed as described above, due to the inclusion of highly conductive carbon, metal oxynitrides, and/or metal nitrides, the electric capacity of the battery may be increased, the amount of the conductive agent may be reduced, and the density of the electrode and high-rate discharge characteristics of the battery may be improved.

The metal oxynitrides may be represented by Formula 4 below:

$$MO_xN_y \quad \text{Formula 4}$$

In Formula 4, 0<x<2, 0<y<1, and M is selected from Ti, V, Mo, and Ta (for example, Ti, V, or Mo).

The metal nitrides may be represented by Formula 5:

$$MN_z \quad \text{Formula 5}$$

In Formula 5, 0<z≤5.1 and M is selected from Ti, V, Mo, and Ta (for example, Ti, V, or Mo).

According to embodiments of the present invention, the lithium metal phosphate-based compound may be coated with carbon in order to improve conductivity. The carbon-coated lithium metal phosphate-based compound may be obtained by heat treating a mixture including a lithium metal phosphate-based compound precursor and a carbon precursor. In general, the carbon precursor may be a hydrocarbon compound. However, the carbon precursor may be any material that is transformed into carbon by carbonization and that is available. An amount of the coated carbon may be about 0.1 to about 10 wt % based on the total weight of the positive active material. However, the amount of the coated carbon may differ according to the desired purpose.

The positive active material for a lithium secondary battery may further include a lithium transition metal oxide, such as those that are conventionally used in lithium secondary batteries. For example, the lithium transition metal oxide active material may include at least one selected from $LiCoO_2$, $LiNiO_2$, $LiMnO_2$, $LiMn_2O_4$, $Li(Ni_aCo_bMn_c)O_2$ (0<a<1, 0<b<1, 0<c<1, a+b+c=1), $LiNi_{1-Y}CO_YO_2$, $LiCo_{1-Y}Mn_YO_2$, $LiNi_{1-Y}Mn_YO_2$ (0≤Y<1), $LiMn_{2-z}Ni_zO_4$, $LiMn_{2-z}Co_zO_4$ (0<Z<2), $LiCoPO_4$, and $LiFePO_4$.

According to embodiments of the present invention, the lithium transition metal oxide may be, for example, $LiCoO_2$.

An amount of the lithium transition metal oxide may be about 0.1 to about 90 parts by weight based on 100 parts by weight of the total weight of the positive active material. If the amount of the lithium transition metal oxide is within this range, the positive active material has good capacity characteristics.

The binder is a component that enhances the binding of an active material to a conductive agent or a current collector, and an amount of the binder may be about 1 to about 10 parts by weight based on 100 parts by weight of the total weight of the positive active material. If the amount of the binder is within this range, the binding force between the active material layer and the current collector may be high.

Nonlimiting examples of the binder include polyvinylidenefluoride, polyvinylalcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubbers, fluoro rubbers, and polyvinylidene fluoride having at least one functional group selected from carboxyl groups, epoxy groups, hydroxyl groups, and carbonyl groups.

According to embodiments of the present invention, the binder includes the conventional binder described above (hereinafter referred to as the "first binder") and a polyvinylidene fluoride having a functional group (hereinafter referred to as the "second binder").

An amount of the second binder may be about 2 to about 40 parts by weight, for example, about 3 to about 10 parts by weight, based on 100 parts by weight of the total weight of the binder. If the amount of the second binder is within this range, the binding force of the active material with respect to the current collector may be further enhanced, and the electrode and the battery manufactured using the binder may have a long lifetime and good stability.

The first binder may be, for example, polyvinylidenefluoride.

The functional group may include at least one selected from carboxyl groups, epoxy groups, hydroxyl groups, and carbonyl groups. In the polyvinylidene fluoride having the functional group, an amount of the functional group may be about $1 \times 10^{-5}$ to about $5 \times 10^{-4}$ mol/g.

According to an embodiment of the present invention, the polyvinylidenefluoride having the functional group may be a polyvinylidenefluoride substituted with a carboxyl group.

The polyvinylidenefluoride including a carboxyl group may be, for example, a carboxyl group-containing polyvinylidenefluoride prepared by copolymerizing a first monomer for forming a polyvinylidenefluoride and a second monomer selected from unsaturated monobasic acids, unsaturated dibasic acids, and alkyl esters thereof.

The amount of the second monomer is about 0.1 to about 3 parts by weight, based on 100 parts by weight of the first monomer.

One nonlimiting example of the unsaturated monobasic acid is an acrylic acid, and one nonlimiting example of the unsaturated dibasic acid is a maleic acid.

The polyvinylidenefluoride containing a carboxyl group may be KF9300, which is manufactured by and commercially available from Kureha Corp.

In the polyvinylidenefluoride containing a carboxyl group (COOH), an amount of the carbonyl group (C=O) may be, for example, about $1 \times 10^{-5}$ to about $5 \times 10^{-4}$ mol/g. In this case, the amount of the functional group may be measured using the method of measuring an amount of a carbonyl group disclosed in U.S. Pat. No. 5,415,958 to Takahashi (lines 16-34, column 8), the entire content of which is incorporated herein by reference.

Hereinafter, a method of manufacturing a lithium secondary battery according to an embodiment of the present invention will be described. The lithium secondary battery includes, for example, a positive electrode, a negative electrode, a lithium salt-containing non-aqueous electrolyte, and a separator.

First, a positive active material, a conductive agent, a binder, a polyurethane-based compound, and a solvent are mixed to prepare a composition for forming a positive active material layer, and the mixture is coated and dried on a current collector to manufacture a positive electrode.

One nonlimiting example of the solvent is N-methylpyrrolidone. An amount of the solvent may be about 1 to about 500 parts by weight based on 100 parts by weight of the positive electrode active material. If the amount of the solvent is within this range, the positive active material layer may be easily formed.

The current collector used to form the positive electrode may have a thickness of about 3 to about 500 μm, and may be formed using any material that does not cause a chemical change in the battery and has high conductivity. The collector may be formed of stainless steel, aluminum, nickel, titanium, heat treated carbon, or aluminum. Alternatively, the collector may be a stainless steel support that is surface-treated with carbon, nickel, titanium, or silver. The collector may have a corrugated surface to facilitate a stronger attachment of the positive electrode active material to the collector. The collector may take various forms, such as a film, a sheet, a foil, a net, a porous product, a foam, or a nonwoven fabric.

The positive electrode may have pores having an average diameter of about 2 to 20 nm, for example, about 5 to about 15 nm, for example, about 5 nm, about 8 nm or about 15 nm. If the average diameter of the pores is within these ranges, an electrode manufactured using the positive electrode may have good high-rate characteristics, a long lifetime, and good interior resistance characteristics.

In the positive electrode, the pore volume may be about $30 \times 10^{-3}$ cm$^3$/g to about $35 \times 10^{-3}$ cm$^3$/g, for example, about $32 \times 10^{-3}$ cm$^3$/g to about $33 \times 10^{-3}$ cm$^3$/g. The average diameter of the pores and the pore volume may be measured using a B.E.T. method.

An electrode having pores with an average diameter and pore volume within the above ranges may have high uniformity and electrode density characteristics.

Separately, a negative active material, a binder, a conductive agent, and a solvent are mixed to prepare a composition for forming a negative active material layer.

Nonlimiting examples of the negative active material include carbonaceous materials, such as graphite or carbon, lithium metal, alloys thereof, and silicon oxides, which intercalate or deintercalate lithium ions. According to an embodiment of the present invention, the negative active material may be silicon oxide.

An amount of the binder may be about 1 to about 10 parts by weight based on 100 parts by weight of the total weight of the negative active material. Nonlimiting examples of the binder include those described above with respect to the positive electrode.

An amount of the conductive agent may be about 1 to about 10 parts by weight based on 100 parts by weight of the total weight of the negative active material. If the amount of the conducting agent is within this range, the resultant electrode has high conductivity.

An amount of the solvent may be about 1 to about 10 parts by weight based on 100 parts by weight of the total weight of the negative active material. If the amount of the solvent is within this range, the negative active material layer may be easily formed.

Nonlimiting examples of the conductive agent and the solvent include those described above with respect to the positive electrode.

A current collector that is used to manufacture the negative electrode may have a thickness of about 3 to about 500 μm, in general. The current collector used to form the negative electrode may be formed using any material that does not cause a chemical change in the battery and has high conductivity. The collector may be formed of copper, stainless steel, aluminum, nickel, titanium, or heat treated carbon. Alternatively, the collector may be a copper or stainless steel support that is surface-treated with carbon, nickel, titanium, or silver, or an aluminum-cadmium alloy. Like the positive electrode current collector, the collector may have a corrugated surface to facilitate a stronger attachment of the negative electrode active material to the collector. The collector may take various forms, such as a film, a sheet, a foil, a net, a porous product, a foam, or a nonwoven fabric.

A separator is placed between the positive electrode and the negative electrode manufactured as described above. The separator may have an average pore diameter of about 0.01 to about 10 μm, and a thickness of about 5 to about 300 μm. The separator may be a sheet or a nonwoven fabric formed of an olefin-based polymer such as polypropylene or polyethylene, or glass fiber. If the electrolyte used is a solid electrolyte such as a polymer, the solid electrolyte may also act as the separator.

The lithium salt-containing non-aqueous electrolyte may include a non-aqueous electrolyte and a lithium salt. The non-aqueous electrolyte may be a non-aqueous electrolytic solution, an organic solid electrolyte, or an inorganic solid electrolyte.

Nonlimiting examples of the non-aqueous electrolytic solution include aprotic organic solvents, such as N-methyl-2-pyrrolidinone, propylene carbonate, ethylene carbonate, butylene carbonate, dimethyl carbonate, diethyl carbonate, gamma-butyrolactone, 1,2-dimethoxy ethane, 2-methyl tetrahydrofuran, dimethylsulfoxide, 1,3-dioxolane, formamide, dimethyl formamide, acetonitrile, nitromethane, methyl formate, methyl acetate, phosphate triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Nonlimiting examples of the organic solid electrolyte include polyethylene derivatives, polyethylene oxide derivatives, polypropylene oxide derivatives, phosphate ester polymers, polyester sulfide, polyvinyl alcohol, and polyvinylidene fluoride.

Nonlimiting examples of the inorganic solid electrolyte include nitrides, halides, and sulfides of lithium, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, or $Li_3PO_4$—$Li_2S$—$SiS_2$.

The lithium salt may be a material that is easily dissolved in the non-aqueous electrolyte, and may be, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3L_1$, $CF_3SO_3Li$, or $(CF_3SO_2)_2NLi$.

FIG. 1 is a cross-sectional perspective view of a lithium secondary battery 30 according to an embodiment of the present invention. Referring to FIG. 1, the lithium battery 30 includes a positive electrode 23, a negative electrode 22, a separator 24 between the positive electrode 23 and the negative electrode 22, a battery case 25, and a sealing member 26 for sealing the battery case 25. The positive electrode 23, the negative electrode 22, and the separator 24 are impregnated with an electrolyte (not shown). The lithium battery 30 is formed by sequentially stacking the positive electrode 23, the separator 24, and the negative electrode 22 and then winding the stacked structure to form an electrode assembly which is placed in the battery case 25. The battery case 25 is then sealed with the sealing member 26.

The following examples are presented for illustrative purposes only and do not limit the purpose and scope of the present invention.

Example 1

Preparation of Positive Electrode and Lithium Secondary Battery Including the Positive Electrode 36 g of $LiFePO_4$ as a positive active material, 0.15 g of polyvinylidenefluoride substituted with a carboxyl group (amount of carboxyl group: about $1.2 \times 10^{-4}$ mole/g), 2 g of polyvinylidenefluoride, 2 g of carbon black, and 0.2 g of polyurethane-based compound represented by Formula 1 (x=30, y=15, z=10) (weight average molecular weight: about 10,000) were dispersed in 60 g of N-methypyrrolidone to prepare a composition for forming a positive active material layer.

The composition for forming the positive active material layer was coated on an aluminum foil to form a film having a thickness of 60 μm, thereby preparing a thin electrode plate. Then, the thin electrode plate was dried at a temperature of 135° C. for at least three hours and then subjected to pressing, thereby completing a positive electrode.

Separately, a negative electrode was manufactured as follows. SiO and polyvinyllidene fluoride were mixed in a weight ratio of 96:4 in N-methypyrrolidone to prepare a composition for forming a negative active material layer. The composition for forming the negative active material layer was coated on a copper foil to form a film having a thickness of 14 μm, thereby preparing a thin electrode plate. Then, the thin electrode plate was dried at a temperature of 135° C. for at least three hours and then subjected to pressing, thereby completing a negative electrode.

In order to prepare an electrolyte, ethylene carbonate (EC), ethylmethyl carbonate (EMC), and dimethylcarbonate (DMC) were mixed in a volumetric ratio of 1:1:1 and then 1.3M $LiPF_6$ was added to the mixed solvent.

A porous polyethylene (PE) film as a separator was placed between the positive electrode and the negative electrode prepared as described above to prepare a battery assembly, and the battery assembly was wound and pressed and placed in a battery case. Then, the electrolyte was loaded into the battery case to complete the manufacturing of the lithium secondary battery having a capacity of 2600 mAh.

Example 2

Preparation of Positive Electrode and Lithium Secondary Battery Including the Positive Electrode A lithium secondary battery was manufactured as in Example 1, except that the amount of the polyurethane-based compound represented by Formula 1 was 0.4 g.

Example 3

Preparation of Positive Electrode and Lithium Secondary Battery Including the Positive Electrode A lithium secondary battery was manufactured as in Example 1, except that the amount of the polyurethane-based compound represented by Formula 1 was 0.6 g.

Comparative Example 1

Preparation of Positive Electrode and Lithium Secondary Battery Including the Positive Electrode A lithium secondary battery was manufactured as in Example 1, except that 0.2 g of the polyurethane-based compound represented by Formula 1 was not used.

Figure 2:
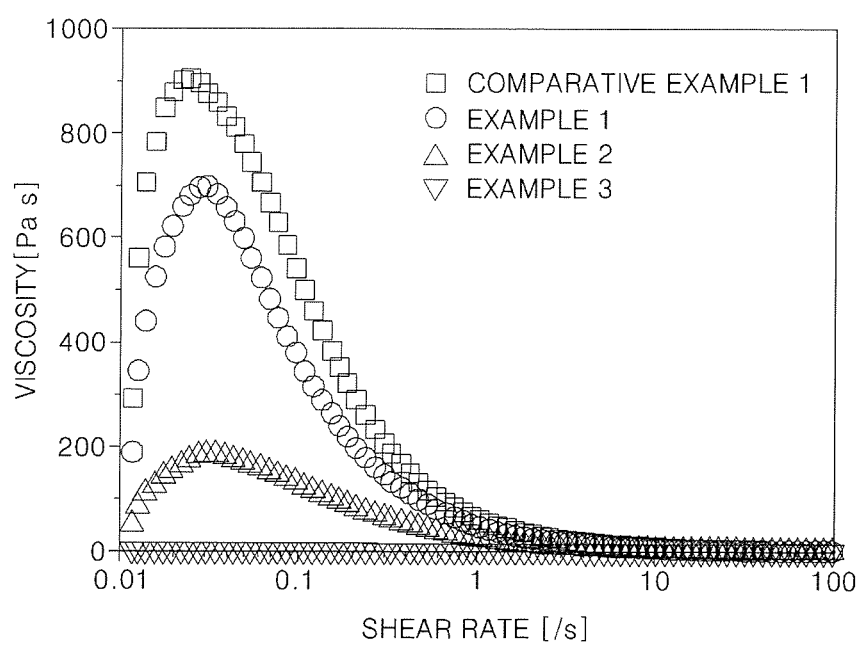
FIG. 2 is a graph comparing the viscosity analysis results of the compositions for forming a positive active material layer prepared according to Examples 1 through 3 and Comparative Example 1.

The viscosity of each of the compositions for forming the positive active material layer according to Examples 1 through 3 and Comparative Example 1 was measured and the results are shown in FIG. 2, and Table 1 below.

TABLE 1

|  | Viscosity (shear rate = 4/s) |
|---|---|
| Example 1 | 13.91 |
| Example 2 | 7.09 |
| Example 3 | 6.46 |
| Comparative Example 1 | 17.76 |

Referring to Table 1 and FIG. 2, it is confirmed that the compositions for forming the positive active material layer prepared according to Examples 1 through 3 have lower viscosities than the composition for forming the positive active material layer prepared according to Comparative Example 1.

Since the compositions for forming the positive active material layer prepared according to Examples 1 through 3 have lower viscosities than the compositions for forming the positive active material layer prepared according to Comparative Example 1, the compositions for forming the positive active material layer prepared according to Examples 1 through 3 are more easily coated on the electrode than the composition for forming the positive active material layer prepared according to Comparative Example 1.

In each of the lithium secondary batteries manufactured according to Examples 1 through 3 and Comparative Example 1, the average diameter of the pores of the positive electrode was measured and the results are shown in Table 2 below. The average diameter of the pores was measured using a B.E.T. method.

TABLE 2

|  | Average diameter of pores (nm) |
|---|---|
| Example 1 | 15 |
| Example 2 | 8 |
| Example 3 | 5 |
| Comparative Example 1 | 21.5 |

For each of the compositions for forming the positive active material layer prepared according to Examples 1 through 3 and Comparative Example 1, the binding force between the current collector and the positive active material layer in the positive electrode was measured and the results are shown in Table 3 below.

The binding force was evaluated as follows. An upper surface of the positive electrode was bonded to a lower surface of a plastic plate (acryl resin, thickness: 5 mm) and a peeling test was performed thereon according to JIS K-6854 so as to measure peeling strength.

TABLE 3

|  | Binding force of positive active material layer (gf/mm) |
|---|---|
| Example 1 | 4.7 |
| Comparative Example 1 | 2.9 |

Referring to Table 3, the positive active material layer of Example 1 has a higher binding force than the positive active material layer of Comparative Example 1.

Figure 3:
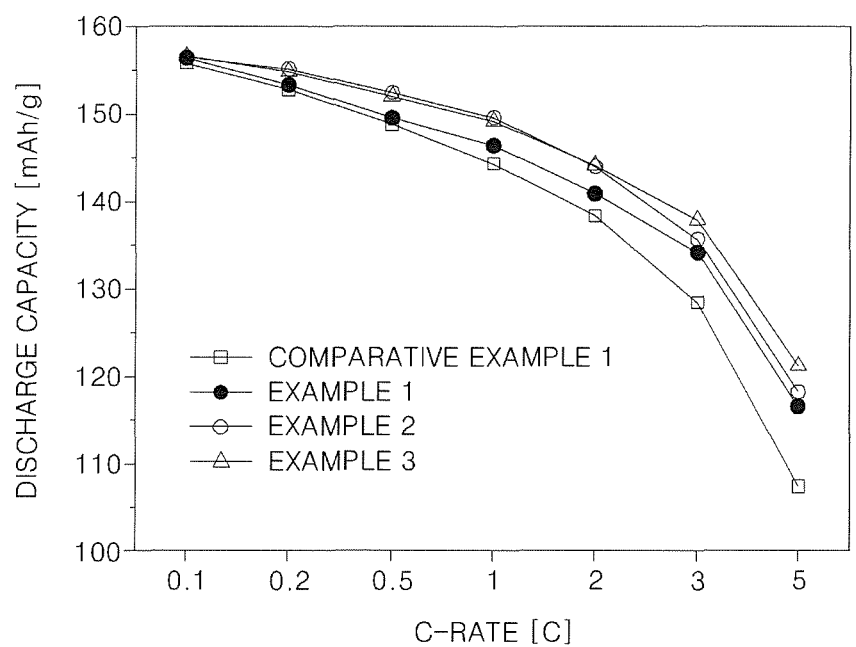
FIG. 3 is a graph comparing the high-rate discharge characteristics of the lithium secondary batteries manufactured according to Examples 1 through 3 and Comparative Example 1.

The high-rate characteristics of the lithium secondary batteries manufactured according to Examples 1 through 3 and Comparative Example 1 were evaluated, and the results are shown in FIG. 3.

The lithium secondary batteries manufactured according to Examples 1 through 3 and Comparative Example 1 were charged with a constant current (0.1 C) and at a constant voltage (1.0V, 0.01 C cut-off), and then rested for 10 minutes. Then, the batteries were discharged with a constant current (0.1 C, 0.2 C, 0.5 C, 1 C, 2 C, or 5 C) until the voltage reached 2.5V. That is, the charge and discharge speed was 0.1 C, 0.2 C, 0.5 C, 1 C, 2 C and 5 C, and the high-rate discharge characteristics of the lithium secondary batteries at the respective charge and discharge speeds were evaluated. The high-rate discharge characteristics are shown in FIG. 3.

In FIG. 3, the term 'C-rate' refers to the discharge rate of the cell, and the C-rate is obtained by dividing the total capacity of the cell by the total discharge time.

Referring to FIG. 3, it is confirmed that the lithium secondary batteries manufactured according to Examples 1 through 3 have better high-rate characteristics than the lithium secondary battery manufactured according to Comparative Example 1.

Figure 4:
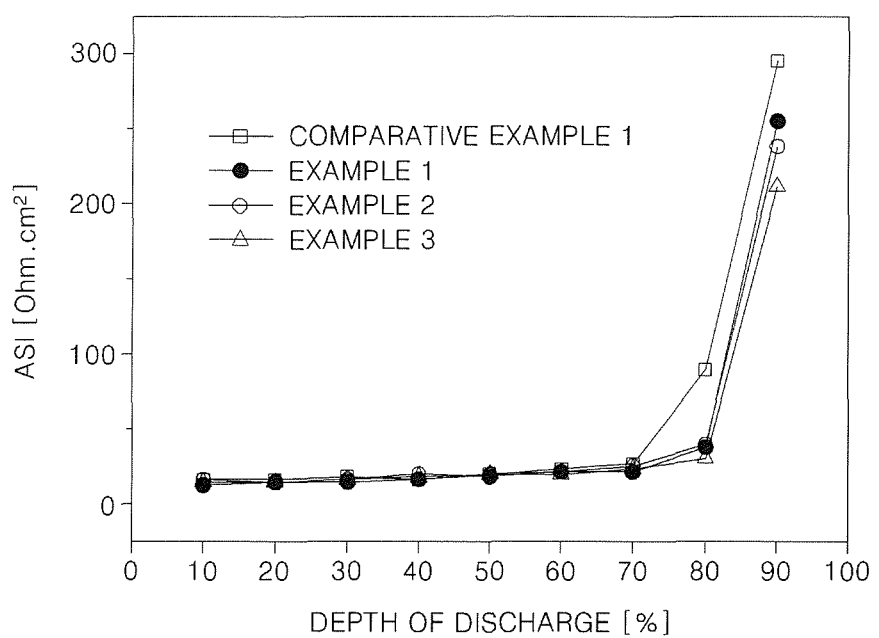
FIG. 4 is a graph comparing the interior resistance characteristics of the lithium secondary batteries manufactured according to Examples 1 through 3 and Comparative Example 1.

Interior resistance characteristics of the lithium secondary batteries manufactured according to Examples 1 through 3 and Comparative Example 1 were evaluated, and the results are shown in FIG. 4. In FIG. 4, the term 'depth of discharge' refers to the discharge rate, and for example, 100% depth of discharge means a full discharge state, and 0% depth of discharge means a full charge state. In FIG. 4, ASI is an abbreviation of area specific impedance.

The interior resistance characteristics are evaluated by measuring a current when two different voltages are applied to a cell and calculating the direct resistance from the current.

Referring to FIG. 4, it is confirmed that the lithium secondary batteries manufactured according to Examples 1 through 3 have lower interior resistance than the lithium secondary battery manufactured according to Comparative Example 1.

Figure 5:
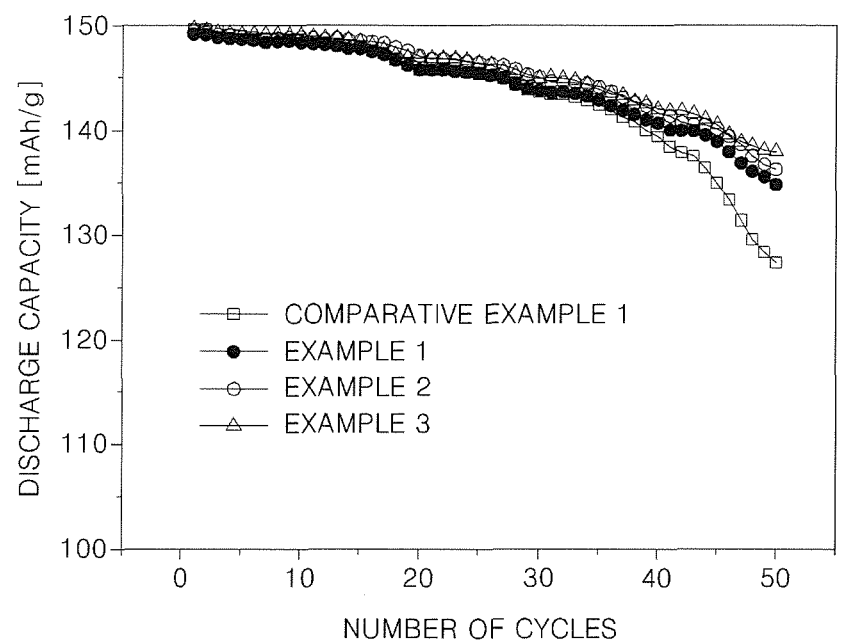
FIG. 5 is a graph comparing the lifetime characteristics of the lithium secondary batteries manufactured according to Examples 1 through 3 and Comparative Example 1.

The lifetime characteristics of the lithium secondary batteries manufactured according to Examples 1 through 3 and Comparative Example 1 were evaluated, and the results are shown in FIG. 5.

Lifetime characteristics are evaluated as follows. The lithium secondary batteries manufactured according to Examples 1 through 3 and Comparative Example 1 were charged with a constant current (1 C) and at a constant voltage (1.0V, 0.01 C cut-off), rested for 10 minutes, and then discharged at a constant current (1 C, room temperature (20° C.), 2.5V cut-off). This charging and discharging was repeated 500 times.

The lifetime characteristics of the respective lithium secondary batteries refer to the change in discharge capacity with respect to the number of charge and discharge cycles. Lifetime characteristics were evaluated and the results are shown in FIG. 5.

Referring to FIG. 5, it is confirmed that the lithium secondary batteries manufactured according to Examples 1 through 3 have better lifetime characteristics than the lithium secondary battery manufactured according to Comparative Example 1.

While certain exemplary embodiments have been described, those of ordinary skill in the art will understand that certain modifications and changes to the described embodiments may be made without departing from the spirit and scope of the disclosure, as described in the appended claims.

What is claimed is:

1. An electrode for a lithium rechargeable battery, comprising:
an electrode active material;
a polyurethane-based compound comprising a compound represented by Formula 1:

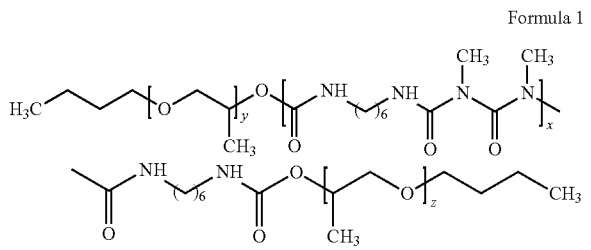

Formula 1 wherein:
x is an integer of 1 to 100,
y is an integer of 1 to 100, and
z is an integer of 1 to 100;
a conductive agent; and
a binder,
wherein the electrode comprises pores having an average pore diameter of about 2 to about 20 nm.

2. The electrode of claim 1, wherein a pore volume of the electrode is about $30 \times 10^{-3}$ cm$^3$/g to about $35 \times 10^{-3}$ cm$^3$/g.

3. The electrode of claim 1, wherein the polyurethane-based compound has a weight average molecular weight of about 5,000 to about 20,000 g/mol.

4. The electrode of claim 1, wherein the binder comprises a first binder component comprising a vinylidene fluoride polymer having a functional group selected from the group consisting of carboxyl groups, epoxy groups, hydroxyl groups, carbonyl groups, and mixtures thereof.

5. The electrode of claim 4, wherein the binder further comprises a second binder component.

6. The electrode of claim 4; wherein the first binder component is present in an amount of about 2 to about 40 parts by weight based on 100 parts by weight of the binder.

7. The electrode of claim 1, wherein the electrode active material comprises a lithium metal-phosphate compound represented by Formula 3:

LiMPO$_4$  Formula 3 wherein M is selected from the group consisting of Fe, Ti, V, Cr, Co and Ni.

8. The electrode of claim 7, wherein the electrode active material further comprises a coating layer comprising a material selected from the group consisting of carbonaceous materials, metal oxynitrides, metal nitrides, and mixtures thereof.

9. The electrode of claim 8, wherein the coating layer comprises a carbonaceous material, a metal oxynitride represented by Formula 4, or a metal nitride represented by Formula 5, or a mixture thereof:

MO$_x$N$_y$  Formula 4 wherein 0<x<2, 0<y<1 and M is Ti, V, Mo, or Ta;

MN$_z$  Formula 5 wherein 0<z≤1, and M is Ti, V, Mo, or Ta.

10. The electrode of claim 1, wherein the polyurethane-based compound comprises a compound represented by Formula 1 in which: x is 30, y is 15 and z is 10.

11. The electrode of claim 1, wherein the binder is present in the electrode in an amount of about 1 to about 10 parts by weight based on 100 parts by weight of the electrode active material.

12. The electrode of claim 1, wherein the binder comprises polyvinylidene fluoride and a polyvinylidenefluoride substituted with a carboxyl group.

13. The electrode of claim 1, wherein the polyurethane-based compound is present in an amount of about 10 to about 50 parts by weight based on 100 parts by weight of the conductive agent.

14. The electrode of claim 1, wherein the polyurethane-based compound is present in an amount of about 0.1 to about 5 parts by weight based on 100 parts by weight of the electrode active material.

15. A lithium rechargeable battery, comprising:
a first electrode comprising:
a first electrode active material;
a polyurethane-based compound comprising a compound represented by Formula 1:

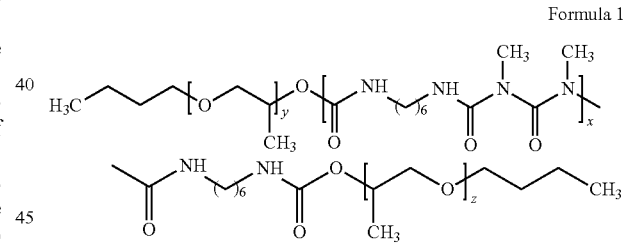

Formula 1 wherein:
x is an integer of 1 to 100,
y is an integer of 1 to 100, and
z is an integer of 1 to 100;
a conductive agent; and
a binder,
wherein the first electrode comprises pores having an average pore diameter of about 2 to about 20 nm;
a second electrode; and
an electrolyte.

16. The lithium rechargeable battery of claim 15, wherein a pore volume of the first electrode is about $30 \times 10^{-3}$ cm$^3$/g to about $35 \times 10^{-3}$ cm$^3$/g.

17. The electrode of claim 15 wherein in Formula 1, x is 30, y is 15, and z is 10.

* * * * *